(12) United States Patent
Lam et al.

(10) Patent No.: US 7,631,417 B2
(45) Date of Patent: Dec. 15, 2009

(54) USE OF ANTI-REFLECTIVE SEED LAYERS FOR THE FABRICATION OF PERPENDICULAR THIN FILM HEADS

(75) Inventors: Hieu Lam, Milpitas, CA (US); Patrick Rush Webb, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 278 days.

(21) Appl. No.: 11/595,765

(22) Filed: Nov. 10, 2006

(65) Prior Publication Data

US 2008/0113090 A1    May 15, 2008

(51) Int. Cl.
 *G11B 5/127*  (2006.01)
 *H04R 31/00*  (2006.01)
(52) U.S. Cl. .............. 29/603.16; 29/603.13; 29/603.15; 29/603.18; 205/119; 205/122; 216/62; 216/65; 216/66; 360/121; 360/122; 360/317; 451/5; 451/41

(58) Field of Classification Search .............. 29/603.07, 29/603.13–603.16, 603.18; 360/121, 122, 360/317; 205/119, 122; 216/62, 65, 66; 451/5, 41
See application file for complete search history.

(56) References Cited

U.S. PATENT DOCUMENTS

| | | | |
|---|---|---|---|
| 6,876,507 B2 | 4/2005 | Chen et al. | |
| 6,912,106 B1 | 6/2005 | Chen et al. | |
| 7,097,923 B2 | 8/2006 | Webb et al. | |
| 2004/0264066 A1 | 12/2004 | Shimizu et al. | |
| 2005/0068671 A1 | 3/2005 | Hsu et al. | |
| 2005/0239001 A1 | 10/2005 | Lee et al. | |
| 2005/0259355 A1 | 11/2005 | Gao et al. | |
| 2006/0044681 A1 | 3/2006 | Le et al. | |
| 2006/0174474 A1 | 8/2006 | Le | |
| 2007/0258167 A1* | 11/2007 | Allen et al. | 360/126 |
| 2008/0110761 A1 | 5/2008 | Lam et al. | |

* cited by examiner

*Primary Examiner*—Paul D Kim
(74) *Attorney, Agent, or Firm*—Lorimer Labs; D'Arcy H. Lorimer (57) ABSTRACT

Methods and structures for the fabrication of perpendicular thin film heads are disclosed. Prior to the deposition of shield structures, seed layers having anti-reflective properties are utilized, eliminating the need to deposit, then remove, traditional inorganic anti-reflection coatings prior to shield plating.

22 Claims, 12 Drawing Sheets

USE OF ANTI-REFLECTIVE SEED LAYERS FOR THE FABRICATION OF PERPENDICULAR THIN FILM HEADS

BACKGROUND OF THE INVENTION

1. Field of the Invention

This invention relates to structures and methods for fabricating perpendicular write heads. More specifically, the invention relates to structures and methods for fabricating wrap around and trailing shields using seed layers with anti-reflective properties prior to shield deposition.

2. Description of the Related Art

Perpendicular write heads are currently well known in the art. Variants of such heads, having wrap around shields and trailing shields, have been recently disclosed. See, for example US Patent Application Publications 2005/0259355, 2006/0044682 and 2006/0174474, assigned to Hitachi Global Storage Technologies, Netherlands B.V.

During the fabrication of the wrap around shield of the prior art, a film stack containing the magnetic pole material, a non-magnetic gap layer, a CMP stop layer, and a number of image transfer layers are deposited. After the pole width is imaged and the film stack etched by a number of consecutive etch processes, a film stack containing the tapered pole material is created. A conformal non-magnetic layer is then deposited, which will serve as the side shield or wrap around shield gap material. Following deposition of the side gap material, a layer of RI-etch-able (or RIE-able, reactive ion etch-able) material is deposited and the structure planarized by CMP. Following planarization, the RI-etch-able material is removed leaving the tapered pole, main gap and side gap materials. A magnetic material is then deposited over this structure by electroplating to form the wrap around shield. Prior to plating, a conductive seed layer is deposited to provide a starting cathode for the plating process. Subsequent to seed layer deposition, a blanket photo resist layer is deposited. This layer is imaged and developed to provide a plating mask for the shield. A non conductive anti-reflective $SiO_xN_y$ coating is usually deposited over the seed layer prior to photo resist deposition to minimize reflective notching during exposure of the photo resist, which must be removed prior to electroplating. Removal of this coating can be difficult due to the complex geometries of the tapered pole, and if not completely removed shield plating integrity will be compromised.

During the formation of trailing shields of the prior art, a film stack containing the magnetic pole material, a non-magnetic gap layer, a CMP stop layer, and a number of image transfer layers are deposited. The pole width is imaged and the film stack etched by a number of consecutive etch processes, creating a film stack containing the tapered pole material. A filler layer is deposited and the resulting structure planarized by CMP to the stop layer. A plating seed layer is subsequently deposited, followed by deposition of an anti-reflective $SiO_xN_y$ coating. As with wrap around shields, the anti-reflective coating must be removed prior to shield plating. Eliminating the need for a separate anti-reflective coating reduces process steps, reducing costs and increasing throughput.

What is needed is a better process for producing the wrap around and trailing shields for the perpendicular write head.

United States Patent Application Publication 2006/0174474 discloses a mask structure for fabricating a write pole for a perpendicular write head. The mask structure includes a first and second hard mask structures separated by an image transfer layer, such as DURIMIDE. The first mask structure may be a bi-layer mask structure that functions as a CMP stop as well as a hard mask for ion milling. The first hard mask is chosen to have a desired resistance to removal by ion milling to maintain excellent track width control during an ion milling process used to form the write pole. Therefore, the first hard mask may be comprises of two layers selected from the group consisting of Rh, alumina, and diamond like carbon (DLC). The second hard mask is constructed of a material that functions as a bottom antireflective coating as well as a hard mask.

United States Patent Application Publication 2006/0044682 discloses a write element for use in perpendicular magnetic recording. The write element including a write pole and a self aligned wrap around shield that can have a trailing shield gap thickness that is different from its side shield gap thickness. The materials making up the trailing shield gap and the side shield gaps can be different materials or can be the same material deposited in two different steps. The side or wrap around portions of the trailing shield can extend down to the level of the leading edge of the write pole or can terminate at some point between the levels of the leading and trailing edge to form a partial wrap around trailing shield.

United States Patent Application Publication 2005/0239001 discloses methods of forming a component of a thin film magnetic head and improving the plating of a component of a thin film magnetic head. The methods include the use of a high activation energy chemically amplified photoresist (CARS) that is contacted with a low pH high saturation magnetic moment plating solution to form a magnetic head component that is essentially free of plating defects. The methods find utility in hard disk drive applications, such as in the manufacture of magnetic poles for the write head of a hard disk drive.

United States Patent Application Publication 2005/0259355 discloses a perpendicular write head including a main pole and a trailing shield, the main pole being made of a diamond-like carbon (DLC) layer as hard mask and a rhodium (Rh) layer as shield gap, both DLC and Rh layers being CMP stop layers so as to avoid corner rounding and damage from chemical mechanical planarization (CMP) process, the DLC layer being removed by reactive ion etching (RIE) to create a trench, the trailing shield being deposited into the trench for self alignment.

United States Patent Application Publication 2005/0068671 discloses a magnetic transducer with separated read and write heads for perpendicular recording. The write head has a trailing shield that extends from the return pole piece toward the main pole piece to form the write gap at the air-bearing surface. One embodiment of the trailing shield is a two part structure with a pedestal and a much smaller tip that confronts the main pole piece at the gap. In one embodiment a sink of non-magnetic, electrically conductive material is disposed in the separation gap between the read head and the flux bearing pole piece. The sink is preferably made of copper and does not extend to the ABS.

United States Patent Application Publication 2004/0264066 discloses at both end portions of at least a soft magnetic layer of a magneto-resistive effect film, a pair of bias magnetic field applying layers are disposed for applying a longitudinal bias magnetic field to the soft magnetic layer via magnetic underlayers. Further, mutual lattice point-to-point distances in the plane where each magnetic underlayer and the corresponding bias magnetic field applying layer are mated, are substantially equalized to each other. Therefore, a coercive force Hc in an in-plane direction (direction parallel to a film surface) of each bias magnetic field applying layer can be maintained at a high level so that even when further gap narrowing or track narrowing is aimed, the bias magnetic field applying layers can act to apply an effective bias magnetic field, i.e. can act to suppress occurrence of the Barkhausen noise.

U.S. Pat. No. 7,097,923 discloses a tri-layer anti-reflective coating for use in photolithographic applications, and specifically, for use in ultraviolet photolithographic processes. The tri-layered anti-reflective coating is used to minimize pattern distortion due to reflections from neighboring features in the construction of microcircuits. The tri-layer anti-reflection coating features a first layer, a first dielectric layer, an absorption layer disposed on the first dielectric layer, and a second dielectric layer, which is then disposed between the absorption layer and a photoresist layer. At least the absorption layer and dielectric layers can be formed using vacuum deposition. A unique character of the tri-layer anti-reflective coatings is that it dampens reflections structures having severe topologies and also allows a thinner anti-reflection layer that has a wider process latitude.

U.S. Pat. No. 6,912,106 discloses a method and system for providing a recording head is disclosed. The method and system include providing a first pole, a second pole, a write gap and at least one coil. The write cap separates the first pole from the second pole. The coil(s) include a plurality of turns and is between the first and second poles. The first pole includes a pedestal that has a first portion and a second portion. The first portion includes a high moment electroplated material. The second portion includes a hot seed layer that has a high moment sputtered material. The second portion of the first pole is adjacent to the write gap.

U.S. Pat. No. 6,876,507 discloses a thin-film write head employing pole pieces formed of an electroplated body-centered cubic (BCC) nickel-iron alloy with a saturation flux density ($B_S$) of 1.9 to 2.3 T (19 to 23 kG) and an acceptable coercivity ($H_C$) of about 80 to about 160 A/m (1-2 Oe). The iron content of the electroplated nickel-iron alloy is from 64% to 81% by weight. The two-layer pole fabrication process holds magnetic anisotropy and coercivity to useable values while improving saturation flux density and optimizing magnetostriction. This is accomplished by first electroplating a BCC nickel-iron layer onto an underlying seed layer and then annealing the two layers to reduce coercivity to less than about 160 amps/meter and raise magnetization to acceptable levels.

SUMMARY OF THE INVENTION

It is an object of the present invention to provide a method for making a perpendicular head including fashioning a pole structure on a surface of a substrate, the pole structure having a tapered pole section in contact with the substrate, and a gap layer deposited on the tapered pole section. The method further includes depositing a conductive seed layer on the gap layer, the conductive seed layer having a reflectivity below 10% after deposition on the gap layer.

It is another object of the present invention to provide a method for making a perpendicular write head having a wrap around shield including fashioning a pole structure on a surface of a substrate, the pole structure having a tapered pole section in contact with the substrate, and a gap layer deposited on the tapered pole section. The method further includes depositing a conductive seed layer on the gap layer, the conductive seed layer having a reflectivity below 10%, after deposition on the gap layer and, depositing a wrap around shield on the conductive seed layer.

It is yet another object of the present invention to provide a method for making a perpendicular write head having a trailing shield including fashioning a pole structure on a surface of a substrate, the pole structure having a tapered pole section in contact with the substrate, and a gap layer deposited on the tapered pole section. The method further includes depositing a conductive seed layer on the gap layer, the conductive seed layer having a reflectivity below 10%, after deposition on the gap layer and, depositing a trailing shield on the conductive seed layer.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 13:
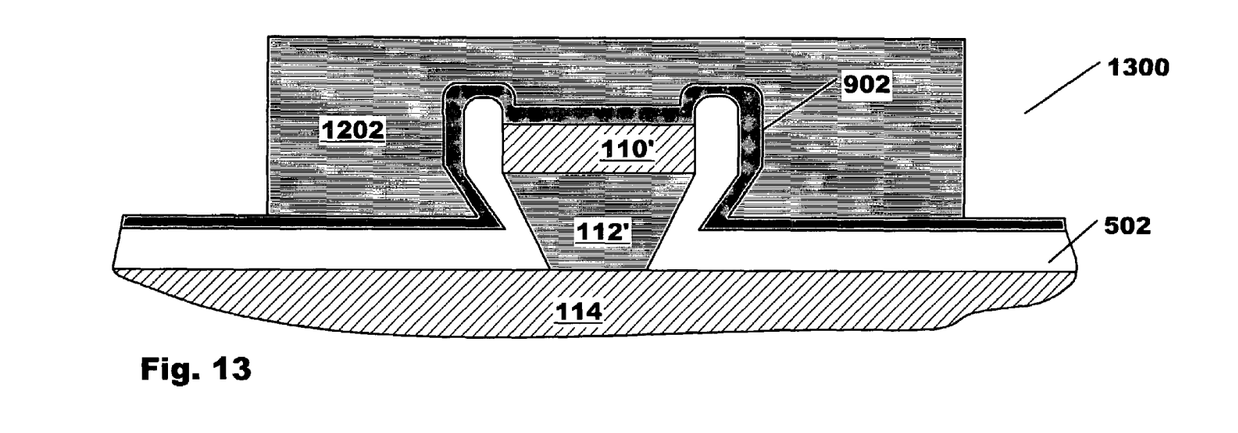
FIG. 13 is a partial cross sectional view looking into the air bearing surface (ABS) of the film structure subsequent to the removal of photo resist layer 1002, during fabrication of a perpendicular write head with a wrap around shield, in accordance with an embodiment of the present invention.
Figure 14:
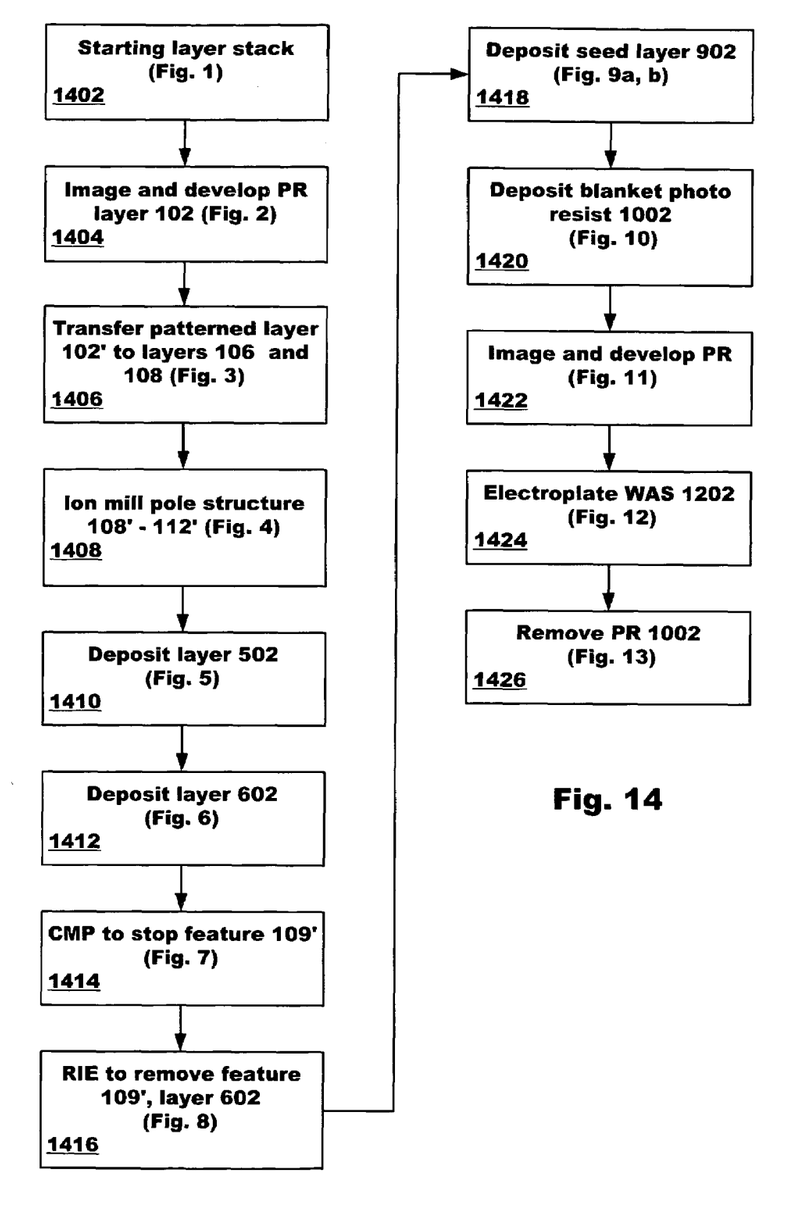
FIG. 14 is a schematic block diagram of the process for fabricating a wrap around trailing shield, in accordance with an embodiment of the present invention.

The features and description of one embodiment the present invention are best understood while viewing the cross sectional structure views (FIGS. 1-13) in light of the process block diagram FIG. 14. An alternate embodiment of the present invention is disclosed in FIGS. 15-16.

Figure 1:
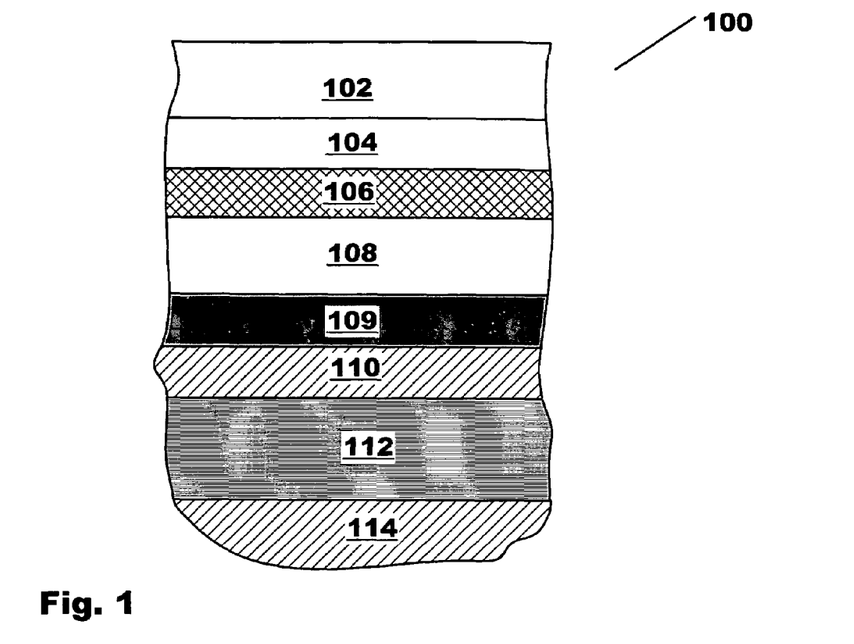
FIG. 1 is a partial cross sectional view looking into the air bearing surface (ABS) of a blanket deposited film stack prior to fabrication of a perpendicular write head with a wrap around shield, in accordance with an embodiment of the present invention.

FIG. 14 is a schematic block diagram of the process for fabricating a wrap around shield, in accordance with an embodiment of the present invention. The process begins at step 1402, wherein the layer stack 100 of FIG. 1 is deposited. FIG. 1 is a partial cross sectional view looking into the air bearing surface (ABS) of a blanket deposited film stack 100 prior to fabrication of a perpendicular write head with a wrap around shield. The film stack comprises blanket layers 102-112 deposited on substrate 114, which is typically alumina (at the air bearing surface), but may be other materials such as magnetic pole shaping layers deeper (further from the ABS) into the structure. For the purposes of this disclosure, substrate 114 can be a bulk material on which all subsequent layers are deposited, or it can be a layer deposited over previously deposited under-layers. For example, when fabricating a combined read and write head structure, the latter is usually the case, as the read head structure is generally deposited first (not shown). Layer 112 makes up the magnetic pole material, and is typically a laminated, multilayer structure comprising layers of magnetic and non-magnetic materials. Above pole layer 112 is gap layer 110, comprised of alumina or other non-magnetic materials. Preferably, alumina is used. Above gap layer 110 is CMP stop layer 109. Typically, DLC (diamond like carbon) is used for this layer. A spacer layer 108 is deposited above DLC layer 109, and is comprised of Durimide. Above spacer layer 108, layers 102, 104, and 106 are deposited. Layer 102 comprises the imaging photo resist layer that defines the width and location of the write pole. Layers 104 and 106 aid in transferring the developed features of photo resist layer 102 to the spacer layer 108. Layer 106 is typically comprised of silica, and layer 104 is typically comprised of Durimide.

Figure 2:
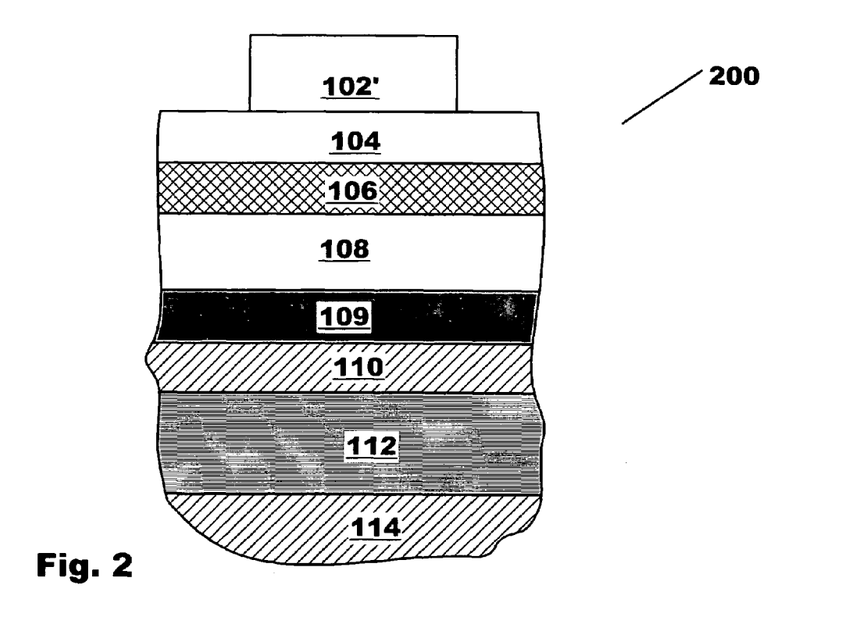
FIG. 2 is a partial cross sectional view looking into the air bearing surface (ABS) of the film structure following the imaging and development of photo-resist layer 102, during fabrication of a perpendicular write head with a wrap around shield, in accordance with an embodiment of the present invention.

In step 1404 of FIG. 14, photo resist layer 102 is imaged and developed, creating feature 102' in FIG. 2. FIG. 2 is a partial cross sectional view looking into the air bearing surface (ABS) of the film structure 200 following the imaging and development of photo-resist layer 102.

Figure 3:
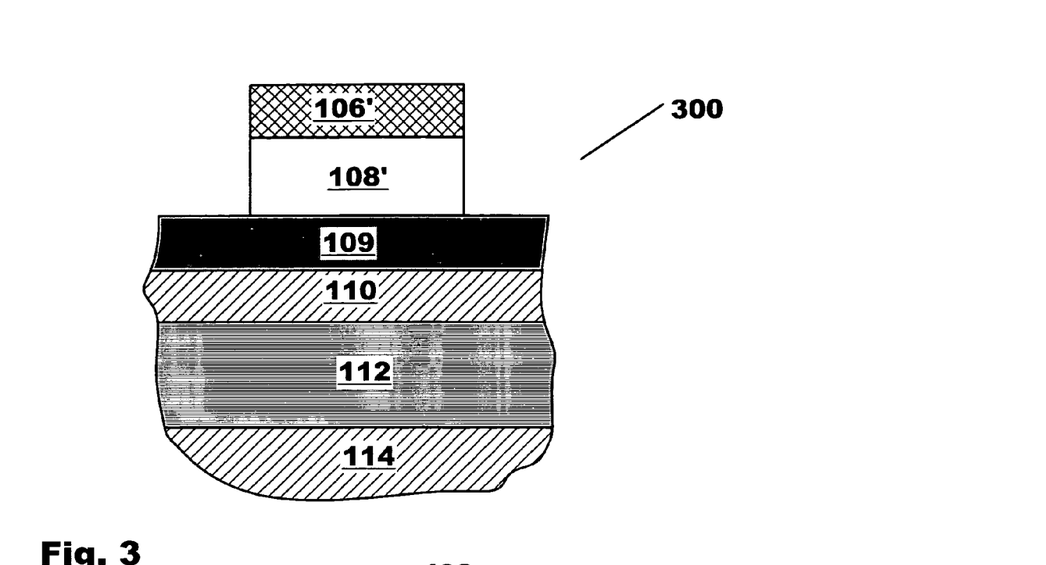
FIG. 3 is a partial cross sectional view looking into the air bearing surface (ABS) of the film structure subsequent to the transfer of patterned feature 102' into layers 106 and 108, during fabrication of a perpendicular write head with a wrap around shield, in accordance with an embodiment of the present invention.

In step 1406 of FIG. 14, photo resist feature 102' is transferred to layers 106 and 108, creating features 106' and 108'. FIG. 3 is a partial cross sectional view looking into the air bearing surface (ABS) of the film structure 300 subsequent to the transfer of patterned feature 102' into layers 106 and 108. The transfer is carried out with three consecutive RIE process steps comprising a first oxidation step to etch layer 104, a second fluorine etch step to etch silica layer 106, followed by a third oxidation step to etch spacer layer 108. Details of the RIE processes are well known to those skilled in the art. During the oxidation steps, photo resist layer 102 is removed, resulting in structure 300.

Figure 4:
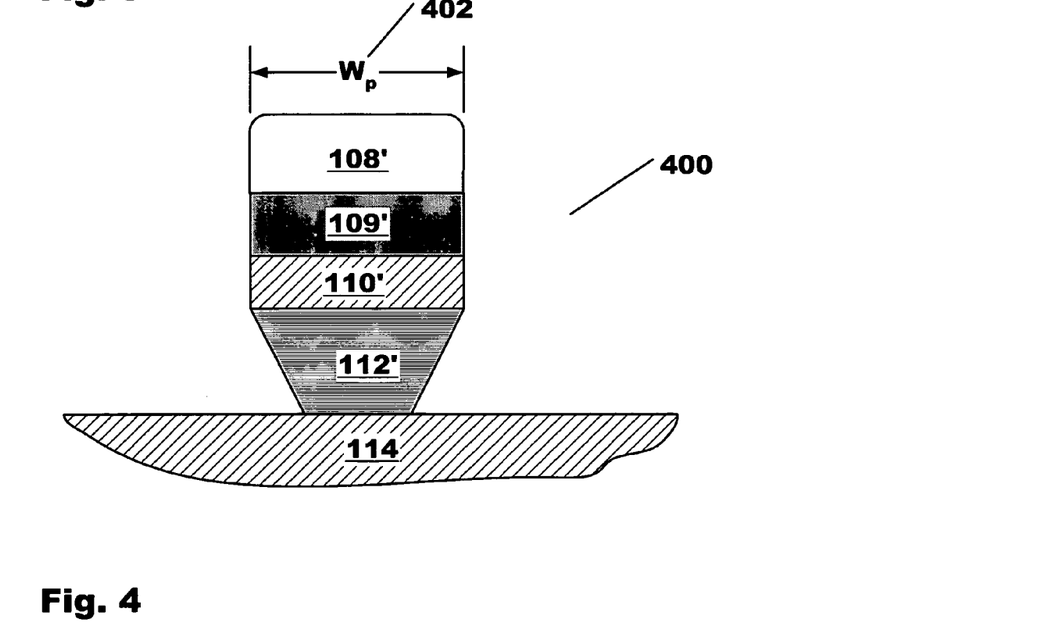
FIG. 4 is a partial cross sectional view looking into the air bearing surface (ABS) of the film structure subsequent to etching and ion milling to form the pole structure, during fabrication of a perpendicular write head with a wrap around shield, in accordance with an embodiment of the present invention.

In step 1408 of FIG. 14, the structure of FIG. 3 is etched and ion milled to form the pole structure comprising features 108', 109', 110', and 112'. FIG. 4 is a partial cross sectional view looking into the air bearing surface (ABS) of the film structure 400 subsequent to etching and ion milling to form the pole structure. The width of the pole structure (108', 109' 110', 112') is $W_p$ 402. Details of the formation of the tapered pole section 112' have been previously disclosed in the prior art and are well known.

Figure 5:
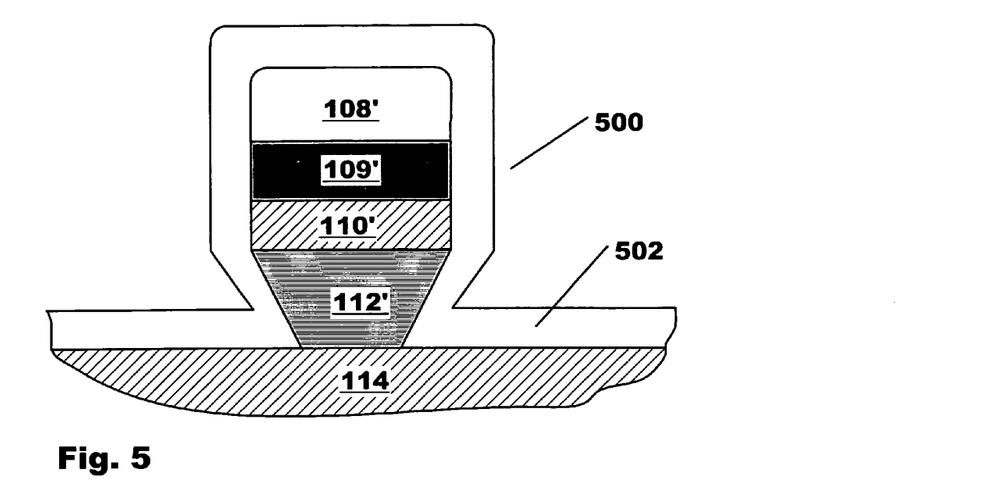
FIG. 5 is a partial cross sectional view looking into the air bearing surface (ABS) of the film structure subsequent to deposition of side gap layer 502, during fabrication of a perpendicular write head with a wrap around shield, in accordance with an embodiment of the present invention.

In step 1410 of FIG. 14, side gap layer 502 is deposited around pole structure 108', 109', 110', 112'. FIG. 5 is a partial cross sectional view looking into the air bearing surface (ABS) of the film structure 500 subsequent to deposition of side gap layer 502, in accordance with an embodiment of the present invention. Layer 502 typically comprises alumina, and is deposited by process that produces conformal coverage of the tapered pole structure. One such process is ALD (atomic layer deposition), but a number of other processes known to those skilled in the art are also suitable.

Figure 6:
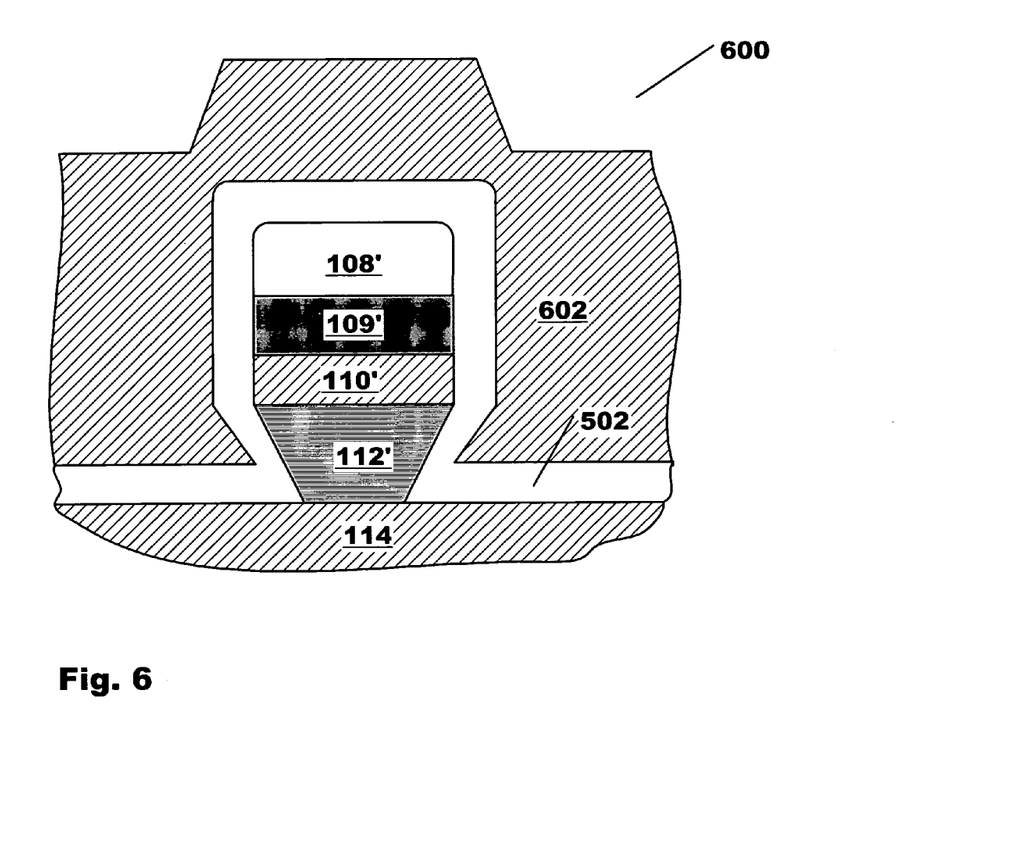
FIG. 6 is a partial cross sectional view looking into the air bearing surface (ABS) of the film structure subsequent to deposition of dielectric layer 602, during fabrication of a perpendicular write head with a wrap around shield, in accordance with an embodiment of the present invention.

In step 1412 of FIG. 14, dielectric layer 602 is deposited. FIG. 6 is a partial cross sectional view looking into the air bearing surface (ABS) of the film structure 600 subsequent to deposition of dielectric layer 602 in accordance with an embodiment of the present invention. Layer 602 typically comprises RIE-able (reactive ion etch-able) materials such as $SiO_2$, $Ta_2O_5$, or $Si_xN_y$.

Figure 7:
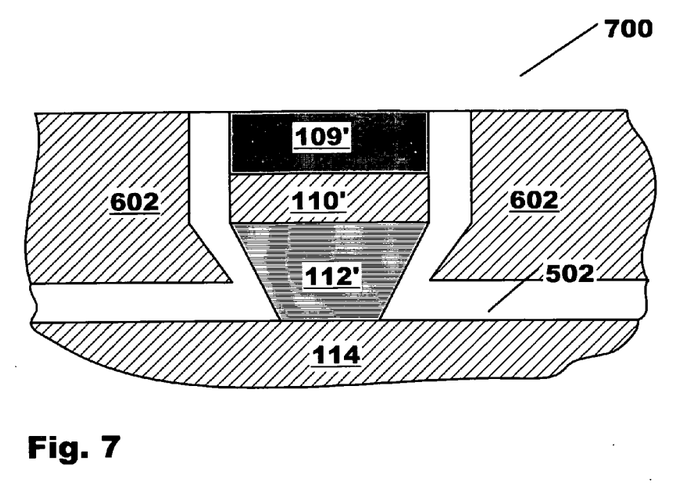
FIG. 7 is a partial cross sectional view looking into the air bearing surface (ABS) of the film structure subsequent to planarization by CMP, during fabrication of a perpendicular write head with a wrap around shield, in accordance with an embodiment of the present invention.

In step 1414 of FIG. 14, structure 600 is planarized by CMP. FIG. 7 is a partial cross sectional view looking into the air bearing surface (ABS) of the film structure 700 subsequent to planarization by CMP in accordance with an embodiment of the present invention. Planarization is slowed or terminated by DLC stop layer 109'.

Figure 8:
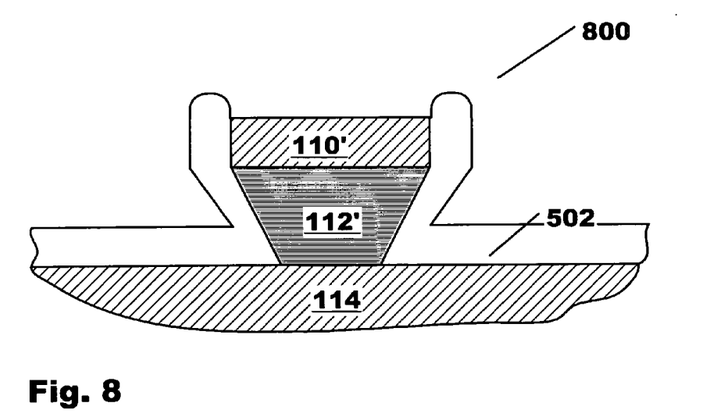
FIG. 8 is a partial cross sectional view looking into the air bearing surface (ABS) of the film structure subsequent to the removal of layers 602 and 109', during fabrication of a perpendicular write head with a wrap around shield, in accordance with an embodiment of the present invention.

In step 1416 of FIG. 14, layers 602 and 109' are removed by RIE processes. FIG. 8 is a partial cross sectional view looking into the air bearing surface (ABS) of the film structure 800 subsequent to the removal of layers 602 and 109', in accordance with an embodiment of the present invention. Layer 109' is removed by an oxidation based RIE process suitable for the removal of DLC layers, whereas layer 602 is removed by conventional RIE processes well known to those skilled in the art.

Figure 9A:
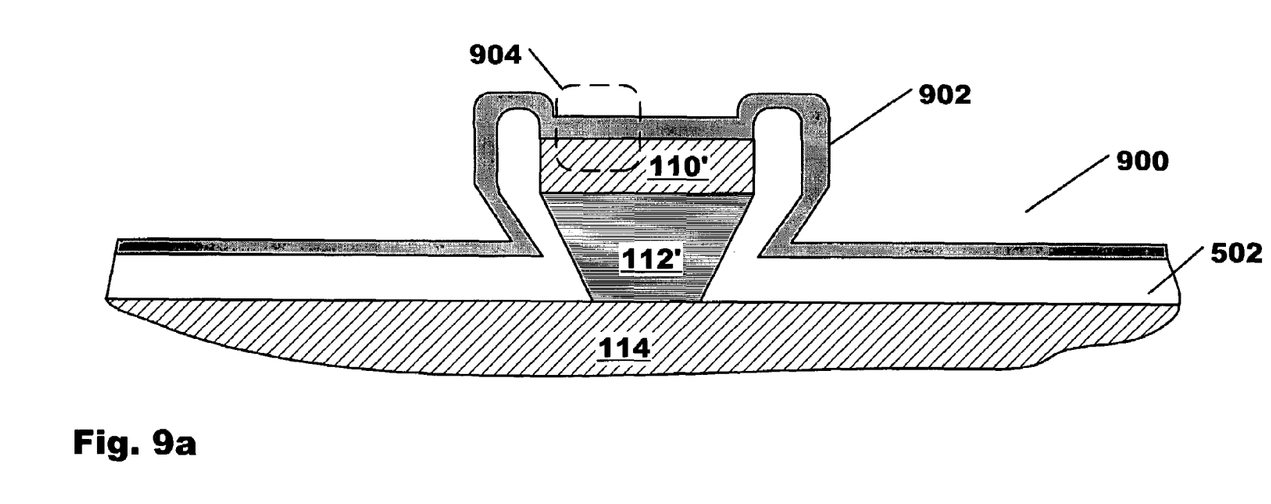
FIG. 9a is a partial cross sectional view looking into the air bearing surface (ABS) of the film structure subsequent to the deposition of seed layer 902, during fabrication of a perpendicular write head with a wrap around shield, in accordance with an embodiment of the present invention.

In step 1418 of FIG. 14, seed layer 902 is deposited over structure 800. FIG. 9a is a partial cross sectional view looking into the air bearing surface (ABS) of the film structure 900 subsequent to the deposition of seed layer 902, in accordance with an embodiment of the present invention. Seed layer 902 serves as conductive cathode layer for the subsequent deposition of the wrap around shield, which is usually deposited by electroplating. Prior to electroplating the shield, portions of the surface covered by seed layer 902 need to be masked to define the locations to which the shield will be confined. The masking is performed by a photo resist layer, which must be exposed and developed to create the mask. During exposure, reflective notching may occur in regions over the pole structure above gap layer 110', which will create false, unwanted patterns when the resist is developed. In processes of the prior art, an inorganic $SiO_xN_y$, anti-reflective coating is deposited above seed layer 902 to prevent reflective notching. Since this coating is non-conductive, it must be removed via an RIE process prior electroplating of the shield structure. Since RIE is basically a "line of sight" process, removing the anti-reflective near the base of the tapered pole is difficult, and patches of anti-reflective coating may remain over the seed layer. During the subsequent electroplating step, these patches may not have metal deposited over them, or the metal plate may contain voids or be poorly adherent in these regions. It is a main advantage of embodiments of the present invention to eliminate the need for a separate anti-reflective coating by providing a seed layer with anti-reflective properties, which can serve the dual purpose of suppressing the reflective notching during photo resist exposure, while also being conductive enough to provide an effective cathode for shield electroplating. The seed layer should also provide good adhesion to both the photo resist and the shield materials. An added advantage of embodiments of the present invention is the elimination of two process steps, specifically the deposition and removal of the ARC (anti-reflective coating).

Figure 9B:
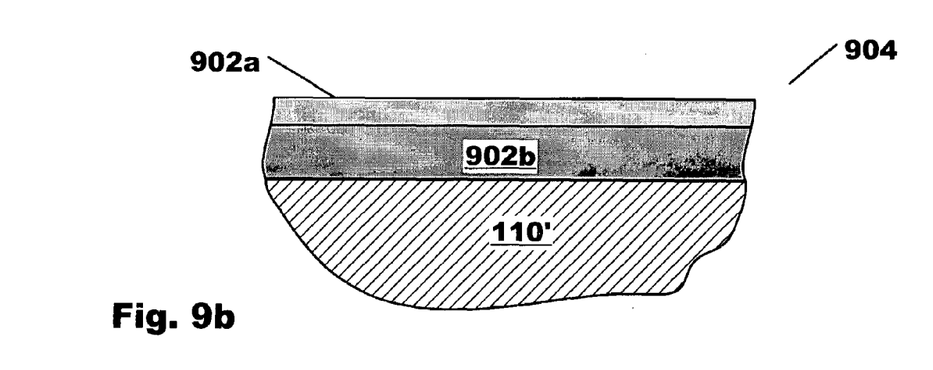
FIG. 9b is a partial cross sectional view of detail 904 of FIG. 9a, for seed layers having a optional capping layer, in accordance with an embodiment of the present invention.

The anti-reflective properties of seed layer 902 are determined by the combined material compositions and thickness of both the seed layer 902 and the gap layer 110', as well as the wavelength of light used for the photo resist exposure. Gap layer 110' should be comprised of a dielectric material to impart the necessary anti-reflective properties to the conductive seed layer 902. Preferably, the dielectric material for layer 110' is alumina ($Al_2O_3$), but may also be $SiO_2$. Seed layer 902 is comprised of a noble metal, chosen from among the group Rh, Ir, and Ru. Preferably, Rh is used. An optional capping layer may be deposited over the noble metal seed layer to improve adhesion to the photo resist. FIG. 9b is a partial cross sectional view of detail 904 of FIG. 9a, for seed layers having a optional capping layer, in accordance with an embodiment of the present invention. Capping layer 902a, if used, is preferably less than about 5 nm and is comprised of Ru or CoFe. Design considerations limit the combined thickness of the non-magnetic portions of seed layer 902 and gap layer 110' to a maximum of about 50 nm, for proper operation of the perpendicular head. Design considerations for proper plating of the wrap around shield limit the seed layer 902 to a minimum thickness of about 10-20 nm. These design considerations are relevant, because the reflectivity R of the seed layer 902 is dependent on both the thickness of gap layer 110' and seed layer 902 in accordance with the present invention. A seed layer having suitable anti-reflective properties should have a reflectivity R less than about 10%, preferably less than 5%, at the wavelength of light the photo resist is exposed. For the photo resists in common usage, two wavelengths of light are of interest, 248 nm and 193 nm.

Figure 9C:
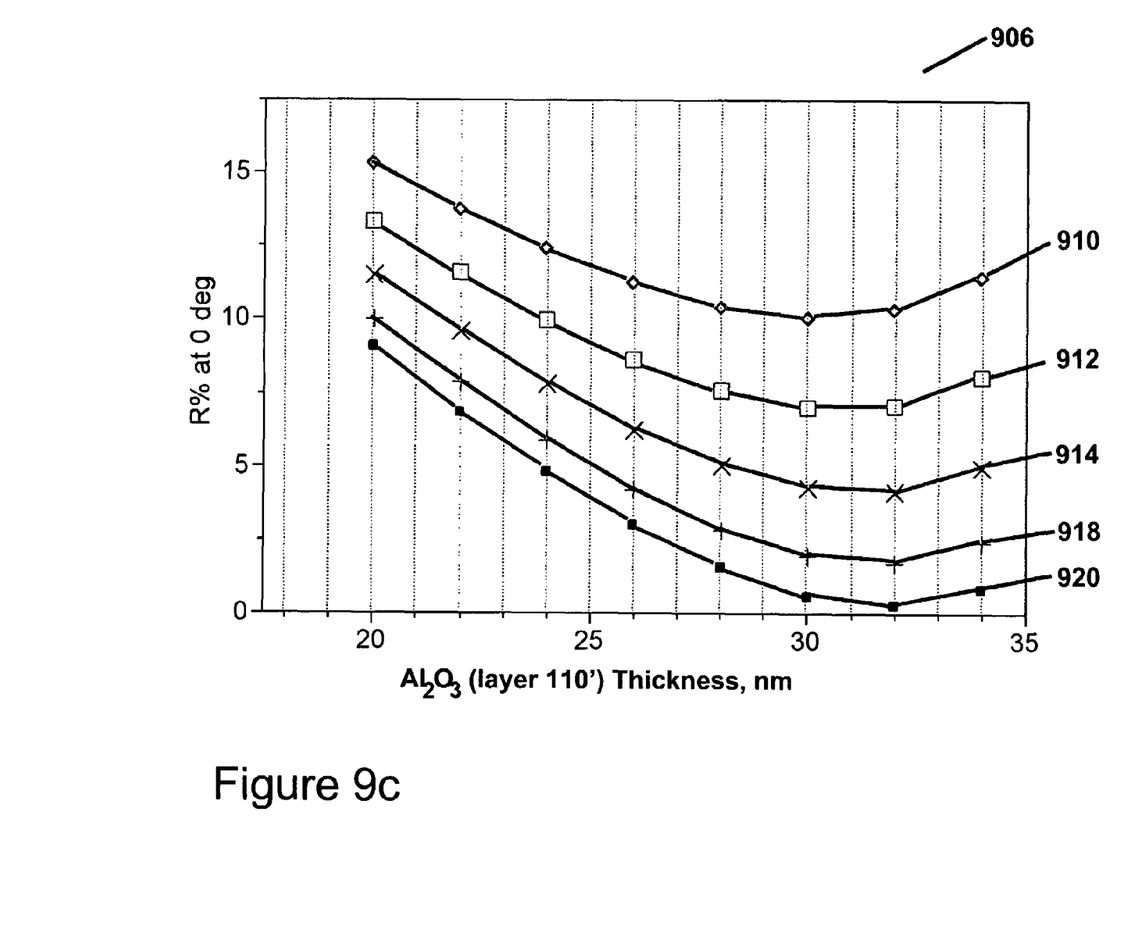
FIG. 9c is a chart of seed layer reflectivity at 248 nm, as a function of layer 110' thickness and seed layer thickness, in accordance with an embodiment of the present invention.

For example, FIG. 9c is a chart 906 of seed layer reflectivity at 248 nm, as a function of layer 110' thickness and seed layer thickness, in accordance with an embodiment of the present invention. In this plot, the reflectivity R (in %) of a seed layer 902 comprising a capping layer 902a of 2 nm Ru over a base seed layer 902b of Rh of various thickness, is shown as a function of alumina gap layer 110' thickness. Curves 910, 912, 914, 918, and 920 correspond to a Rh thickness of 16, 14, 12, 10, and 8 nm, respectively. All curves 910-920 show a minimum in reflectivity for an alumina gap layer thickness of about 30-32 nm. The curves also show a monotonic decrease in reflectivity as gap layer 110' increases in thickness from about 20 nm to about 30-32 nm. Reflectivity increases again as gap layer 110' increases in thickness above about 30-32 nm. At any given gap layer thickness, reflectivity decreases as the Rh base seed layer 902b thickness decreases. For reflectivity values less than 10%, FIG. 9c shows that the Rh base seed layer 902b should be below about 16 nm in thickness, and that all values of layer 110' thickness from 20 nm to 35 nm are suitable if the Rh base seed layer 902b thickness is below about 10 nm.

Figure 9D:
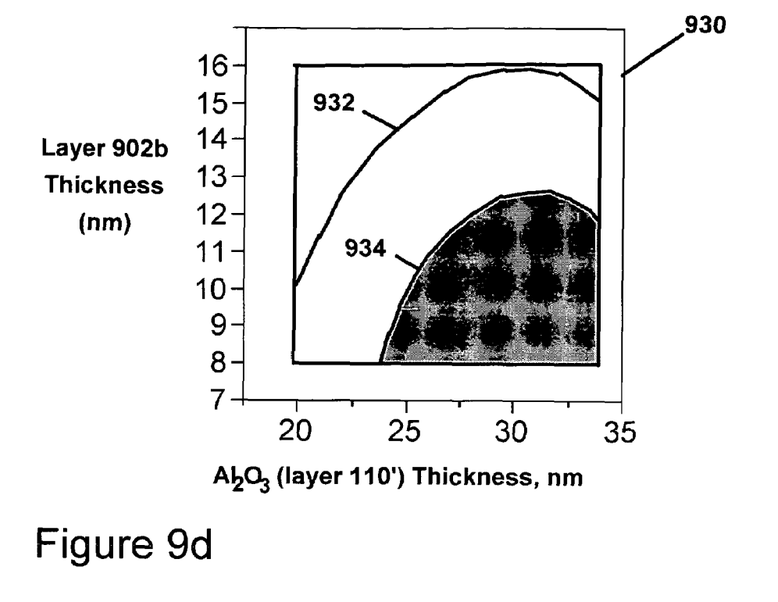
FIG. 9d is a chart of seed layer 902b thickness versus layer 110' thickness for a given seed layer reflectivity at 248 nm, in accordance with an embodiment of the present invention.

FIG. 9d is a chart 930 of Rh seed layer 902b thickness versus gap layer 110' thickness for a given seed layer reflectivity at 248 nm, in accordance with an embodiment of the present invention. This is the same data shown in FIG. 9c. Curve 932 represents the locus of values corresponding to a reflectivity R of 10%. Curve 934 represents the locus of values corresponding to a reflectivity R of 5%. The area under curve 932 represents acceptable values of seed layer thickness and gap layer thickness resulting in a reflectivity R less than 10%. The shaded area under curve 934 represents preferred values of seed layer thickness and gap layer thickness resulting in a reflectivity R less than 5%. It is useful to note that all values under curve 932 meet the basic design criteria for a seed layer cited above, i.e. a seed layer 902 greater than 10 nm in thickness, and a gap layer+seed layer thickness less than 50 nm.

Figure 9E:
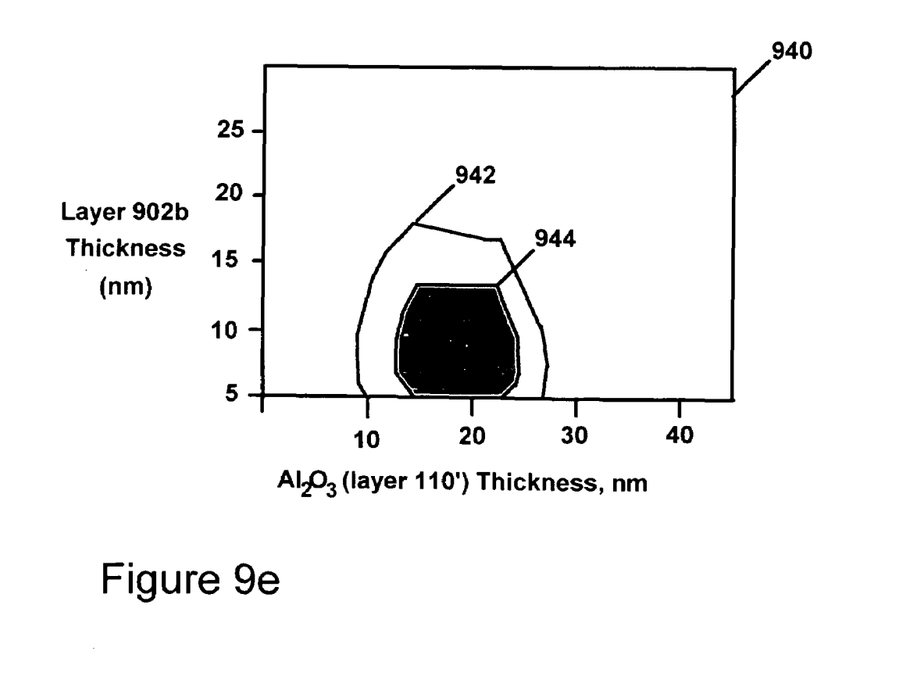
FIG. 9e is a chart of seed layer 902b thickness versus layer 110' thickness for a given seed layer reflectivity at 193 nm, in accordance with an embodiment of the present invention.

In another example, FIG. 9e is a chart 940 of seed layer 902b thickness versus alumina layer 110' thickness for a given seed layer reflectivity at 193 nm, in accordance with an embodiment of the present invention. Curve 942 represents the locus of values corresponding to a reflectivity R of 10% for a Rh seed layer 902b having a 2 nm capping layer 902a of Ru. Curve 944 represents the locus of values corresponding to a reflectivity R of 5%. The area under curve 942 represents acceptable values of seed layer thickness and gap layer thickness resulting in a reflectivity R less than 10%. The shaded area under curve 944 represents preferred values of seed layer thickness and gap layer thickness resulting in a reflectivity R less than 5%. For the shorter wavelength of 193 nm, the suitable alumina gap layer 110' thickness range is reduced to about 10-27 nm.

Figure 10:
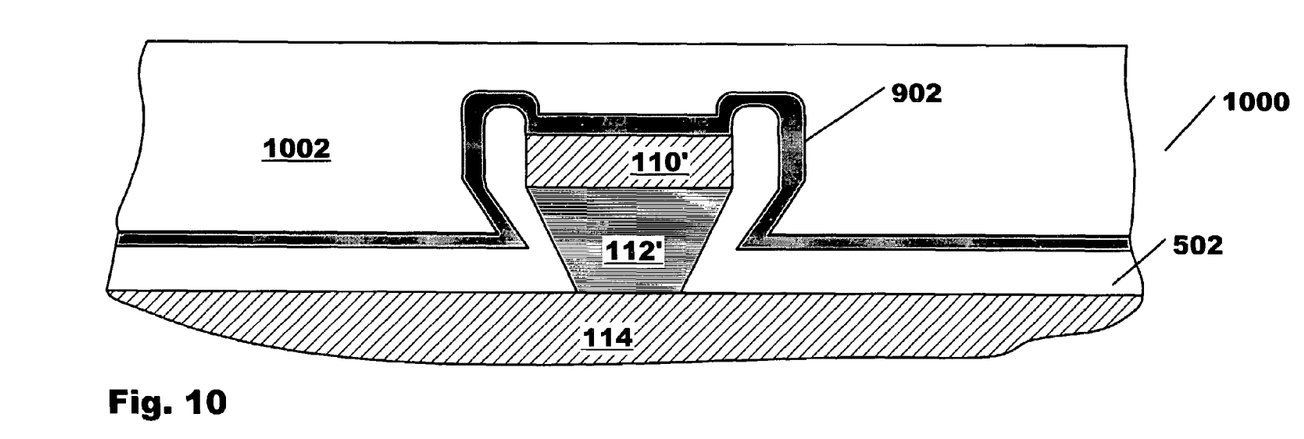
FIG. 10 is a partial cross sectional view looking into the air bearing surface (ABS) of the film structure subsequent to the deposition of photo resist layer 1002, during fabrication of a perpendicular write head with a wrap around shield, in accordance with an embodiment of the present invention.

Returning to FIG. 14, in step 1420 a blanket photo resist is deposited over anti-reflective seed layer 902. FIG. 10 is a partial cross sectional view 1000 looking into the air bearing surface (ABS) of the film structure subsequent to the deposition of photo resist layer 1002, during fabrication of a perpendicular write head with a wrap around shield, in accordance with an embodiment of the present invention.

Figure 11:
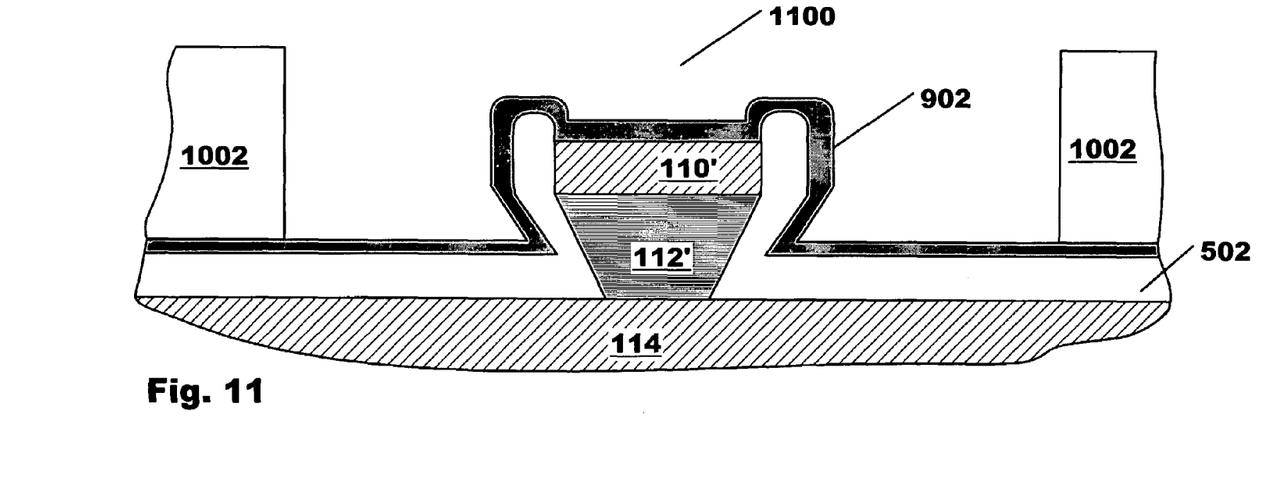
FIG. 11 is a partial cross sectional view looking into the air bearing surface (ABS) of the film structure subsequent to the imaging and development of photo resist layer 1002, during fabrication of a perpendicular write head with a wrap around shield, in accordance with an embodiment of the present invention.

In step 1422 of FIG. 14, photo resist layer 1002 is imaged and developed in accordance with methods well known to those skilled in the art. FIG. 11 is a partial cross sectional view 1100 looking into the air bearing surface (ABS) of the film structure subsequent to the imaging and development of photo resist layer 1002, during fabrication of a perpendicular write head with a wrap around shield, in accordance with an embodiment of the present invention.

Figure 12:
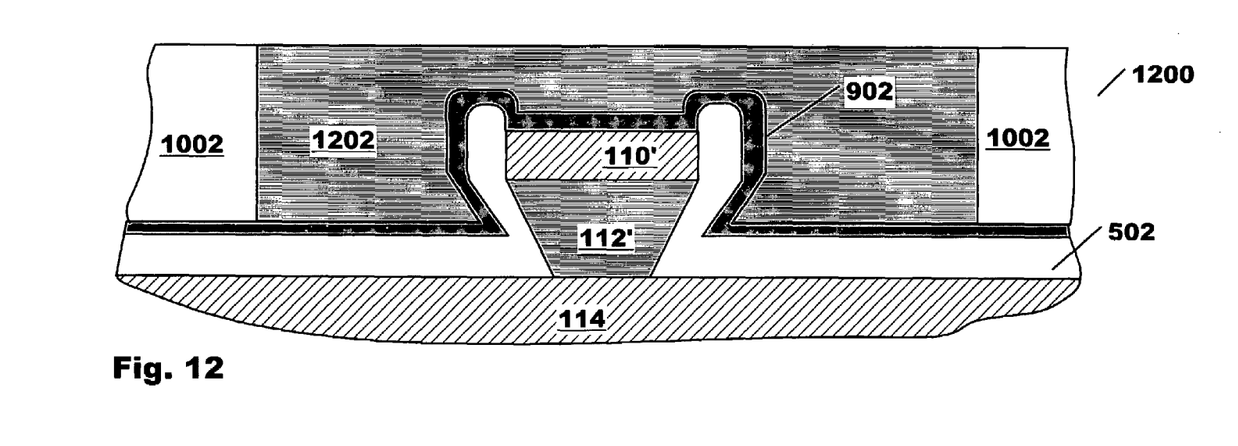
FIG. 12 is a partial cross sectional view looking into the air bearing surface (ABS) of the film structure subsequent to the deposition of shield layer 1202, during fabrication of a perpendicular write head with a wrap around shield, in accordance with an embodiment of the present invention.

In step 1424 of FIG. 14, the wrap around shield is deposited over seed layer 902 via electroplating, a process well known to those skilled in the art. FIG. 12 is a partial cross sectional view 1200 looking into the air bearing surface (ABS) of the film structure subsequent to the deposition of shield layer 1202, during fabrication of a perpendicular write head with a wrap around shield, in accordance with an embodiment of the present invention.

In step 1426 of FIG. 14, the photo resist layer 1002 is removed by methods well known to skilled in the art. FIG. 13 is a partial cross sectional view 1300 looking into the air bearing surface (ABS) of the film structure subsequent to the removal of photo resist layer 1002, during fabrication of a perpendicular write head with a wrap around shield, in accordance with an embodiment of the present invention.

The forgoing discussion has been focused upon the process for making a perpendicular write head having a wrap around shield. However, the suitability and application of anti-reflective seed layers is not limited only to the production of wrap around shields, but may be applied to perpendicular write heads having trailing shields as well. For simplification, structures corresponding to process steps prior to seed layer deposition are not shown for the trailing shield.

Figures 15A, 15B:
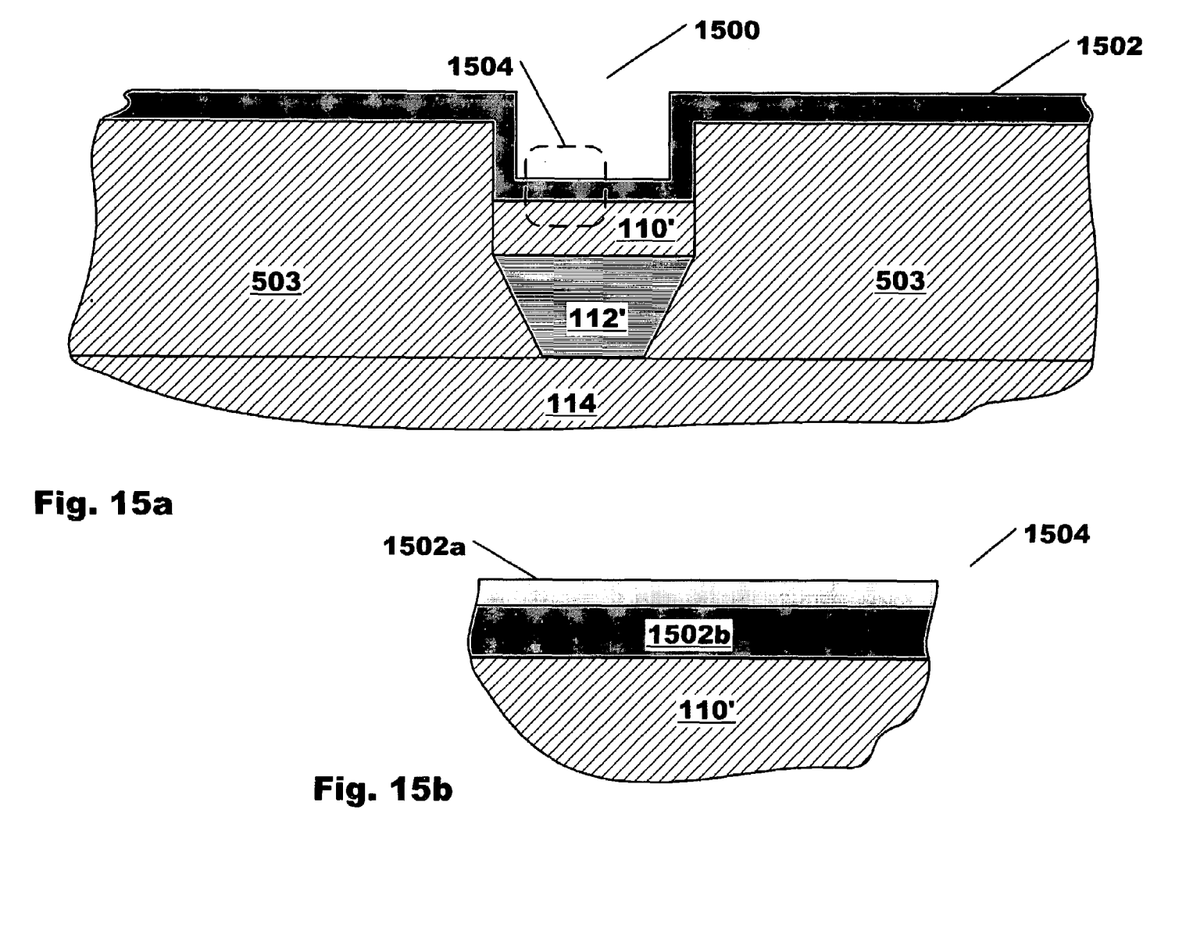
FIG. 15a is a partial cross sectional view looking into the air bearing surface (ABS) of the film structure subsequent to the deposition of seed layer 1502, during fabrication of a perpendicular write head with a trailing shield, in accordance with an alternate embodiment of the present invention.
FIG. 15b is a partial cross sectional view of detail 1504 of FIG. 15a, for seed layers having a optional capping layer, in accordance with an alternate embodiment of the present invention; and, FIG. 16 is a partial cross sectional view looking into the air bearing surface (ABS) of the film structure subsequent to the deposition of trailing shield 1602, in accordance with an alternate embodiment of the present invention.

FIG. 15*a* is a partial cross sectional view 1500 looking into the air bearing surface (ABS) of the film structure subsequent to the deposition of anti-reflective seed layer 1502, during fabrication of a perpendicular write head with a trailing shield, in accordance with an alternate embodiment of the present invention. In structure 1500, tapered magnetic pole structure 112', gap layer 112', and filler layer 503 have been previously deposited on substrate 114 and planarized by methods well known to those skilled in the art.

FIG. 15*b* is a partial cross sectional view of detail 1504 of FIG. 15*a*, for seed layers 1502 having a optional capping layer 1502*a*, in accordance with an alternate embodiment of the present invention. The materials, thickness ranges, reflectivity and other limitations disclosed above for gap layer 110' and seed layer 902, 902*a*, 902*b* above apply equally to seed layer 1502, 1502*a*, 1502*b* for this alternative embodiment of the present invention.

Figure 16:
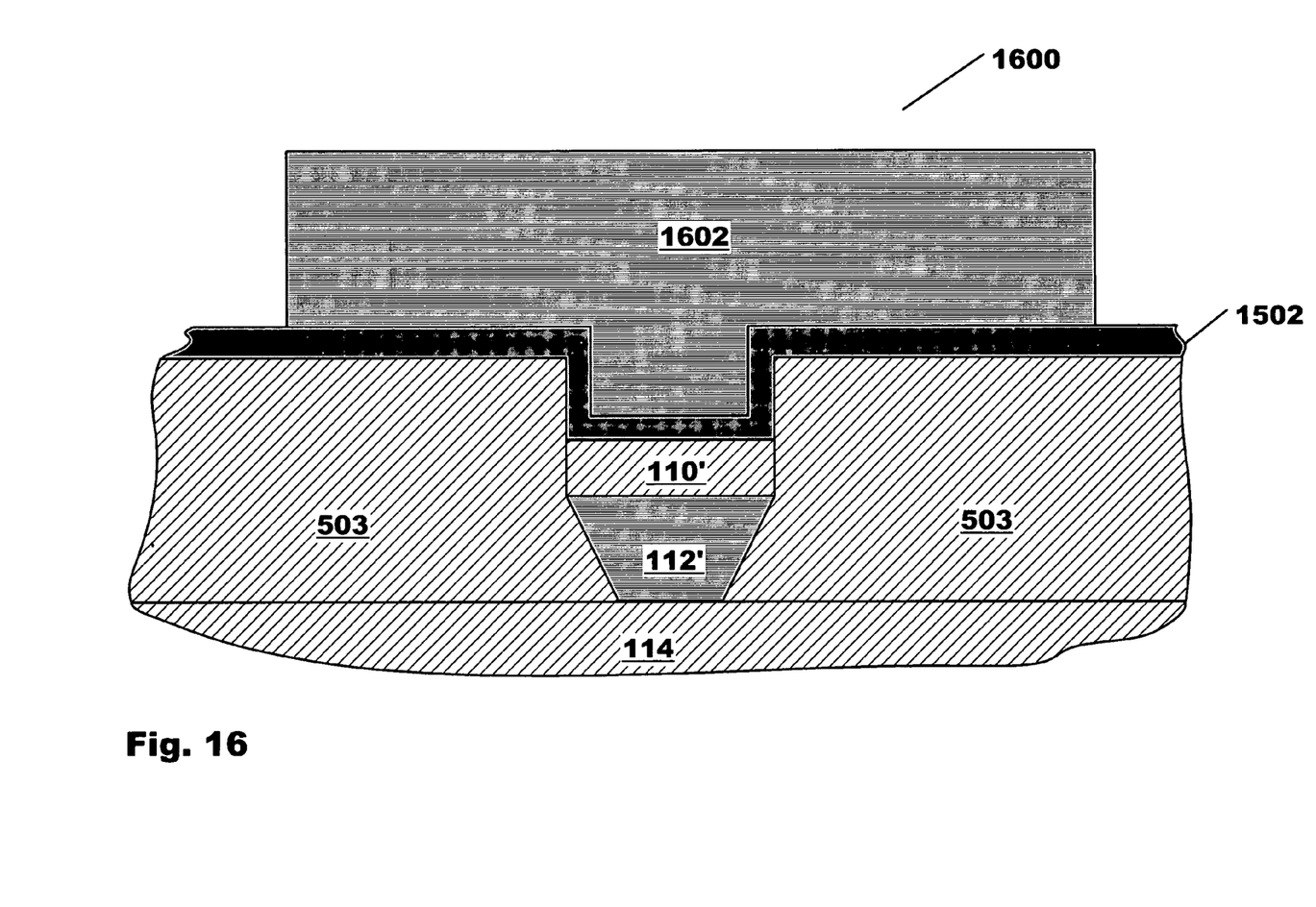

FIG. 16 is a partial cross sectional view 1600 looking into the air bearing surface (ABS) of the film structure subsequent to the deposition of trailing shield 1602, in accordance with an alternate embodiment of the present invention. The preceding steps of photo resist deposition, exposure, development and removal are not shown, as these processes are self evident to those of skill in the art, and in the light of the forgoing embodiments and discussion.

The present invention is not limited by the previous embodiments heretofore described. Rather, the scope of the present invention is to be defined by these descriptions taken together with the attached claims and their equivalents.

What is claimed is:

1. A method for making a perpendicular head comprising:
fashioning a pole structure on a surface of a substrate, said pole structure having a tapered pole section in contact with said substrate, and a gap layer deposited on said tapered pole section; and,
depositing a conductive seed layer on said gap layer, a combination of said gap layer and said conductive seed layer having a reflectivity below 10%, after deposition of said conductive seed layer on said gap layer.

2. The method as recited in claim 1, wherein said gap layer is a dielectric having a first thickness, and said conductive seed layer is a metal having a second thickness.

3. The method as recited in claim 2, wherein said reflectivity is measured at a wavelength of about 248 nm.

4. The method as recited in claim 3, wherein said first thickness is between 20 and 35 nm.

5. The method as recited in claim 4, wherein said dielectric is an aluminum oxide.

6. The method as recited in claim 4, wherein said dielectric is an oxide of silicon.

7. The method as recited in claim 3, wherein said second thickness is between 8 and 16 nm.

8. The method as recited in claim 7, wherein said conductive seed layer comprises Rh, Ru, and Ir.

9. The method as recited in claim 8, wherein said conductive seed layer comprises Rh.

10. The method as recited in claim 2, wherein said reflectivity is measured at a wavelength of about 193 nm.

11. The method as recited in claim 10, wherein said first thickness is between 10 and 27 nm.

12. The method as recited in claim 11, wherein said dielectric is an aluminum oxide.

13. The method as recited in claim 11, wherein said dielectric is an oxide of silicon.

14. The method as recited in claim 10, wherein said second thickness is between 5 and 17 nm.

15. The method as recited in claim 14, wherein said conductive seed layer comprises Rh, Ru, and Ir.

16. The method as recited in claim 15, wherein said conductive seed layer comprises Rh.

17. A method for making a perpendicular write head having a wrap around shield comprising:
fashioning a pole structure on a surface of a substrate, said pole structure having a tapered pole section in contact with said substrate, and a gap layer deposited on said tapered pole section;
depositing a conductive seed layer on said gap layer, a combination of said gap layer and said conductive seed layer having a reflectivity below 10%, after deposition of said conductive seed layer on said gap layer; and,
depositing a wrap around shield on said conductive seed layer.

18. The method as recited in claim 17, wherein said gap layer and said conductive seed layer have a combined thickness less than 50 nm.

19. The method as recited in claim 18, wherein said conductive seed layer is greater than 10 nm in thickness.

20. A method for making a perpendicular write head having a trailing shield comprising:
fashioning a pole structure on a surface of a substrate, said pole structure having a tapered pole section in contact with said substrate, and a gap layer deposited on said tapered pole section;
depositing a conductive seed layer on said gap layer, a combination of said gap layer and said conductive seed layer having a reflectivity below 10%, after deposition of said conductive seed layer on said gap layer; and,
depositing a trailing shield on said conductive seed layer.

21. The method as recited in claim 20, wherein said gap layer and said conductive seed layer have a combined thickness less than 50 nm.

22. The method as recited in claim 21, wherein said conductive seed layer is greater than 10 nm in thickness.

* * * * *